United States Patent
Paxhia et al.

[15] 3,703,639
[45] Nov. 21, 1972

[54] RADIATION MOISTURE MEASURING SYSTEM HAVING THERMOELECTRICALLY COOLED DETECTOR

[72] Inventors: Emannuel A. Paxhia, Churchville; David A. Willett, Hopewell, both of N.Y.

[73] Assignee: Sybron Corporation, Rochester, N.Y.

[22] Filed: Nov. 12, 1969

[21] Appl. No.: 875,637

[52] U.S. Cl. ................. 250/83.3 H, 62/3, 250/83 R
[51] Int. Cl. ............................................. G01j 5/12
[58] Field of Search........... 250/83.3 H, 83 R, 43.5 R; 62/3, DIG. 9, 12, 1

[56] References Cited

UNITED STATES PATENTS 3,551,678  12/1970  Mitchell............... 250/83.3 H
3,103,587  9/1963  Ure, Jr. et al..................... 62/3
3,245,261  4/1966  Buteux et al.......... 250/83.3 H

*Primary Examiner*—Archie R. Borchelt
*Attorney*—Theodore B. Roessel

[57] ABSTRACT

An infrared moisture measuring system has an infrared radiation sensing element. The sensing element is mounted on a thermo-electric cooler and is contained in a sealed housing. The housing has a window transparent to infrared radiation coming from a material containing moisture which affects the radiation. The housing contains a desiccant which absorbs any moisture that may be present in the housing, and is contained within an outer housing also having a window transparent to said radiation. The atmosphere within each of said housings is substantially the same as that external to the outer housing.

15 Claims, 5 Drawing Figures

3,703,639
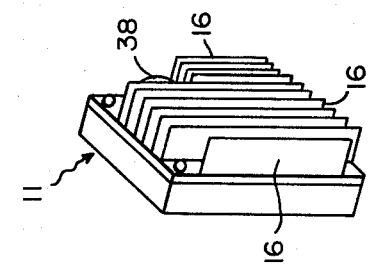
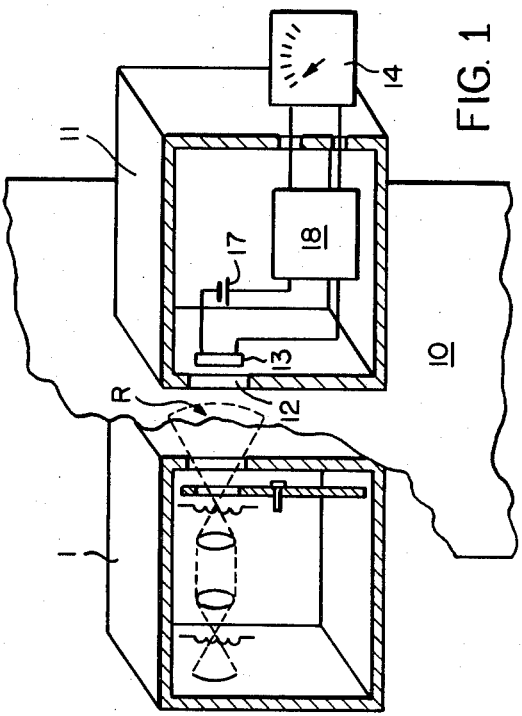
FIG. 4
FIG. 1
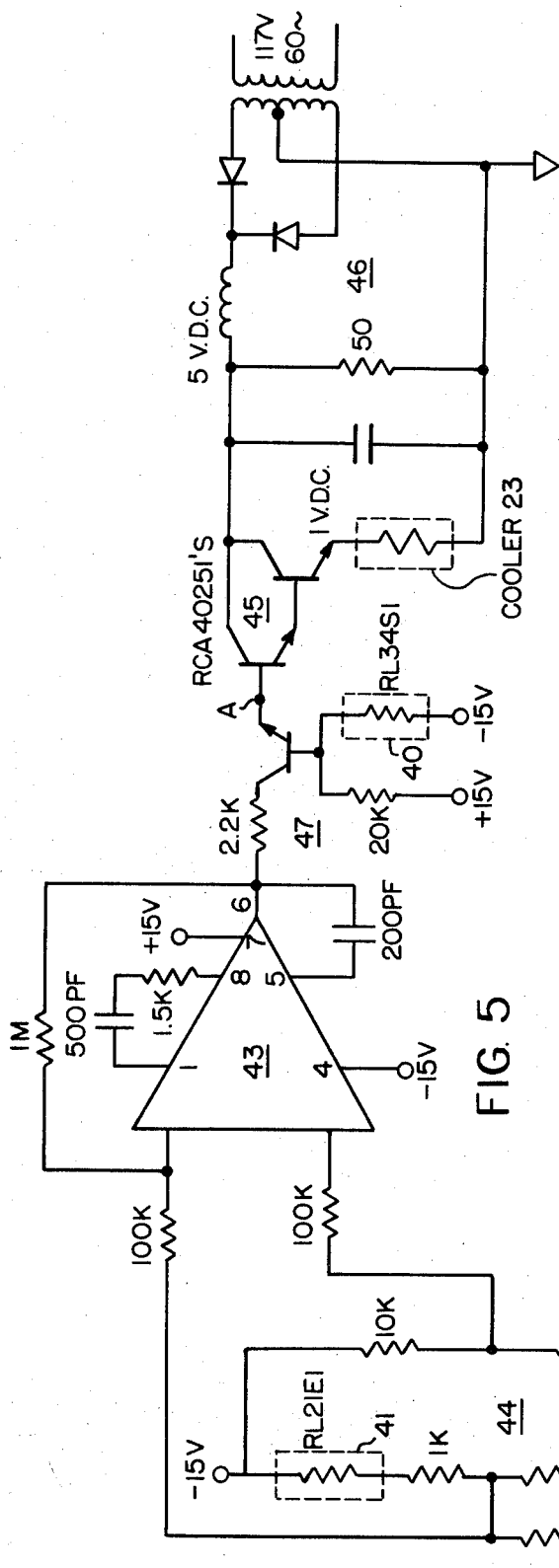
FIG. 5
INVENTORS
E. A. PAXHIA AND
D. A. WILLETT
BY Theodore B. Roessel
ATTORNEY

INVENTORS
E. A. PAXHIA AND
D. A. WILLETT

BY Theodore B. Roessel
ATTORNEY

RADIATION MOISTURE MEASURING SYSTEM HAVING THERMOELECTRICALLY COOLED DETECTOR

CROSS REFERENCES TO RELATED APPLICATIONS, IF ANY

Richard L. Mitchell application for U.S. Pat., Ser. No. 615,422, filed Feb. 13, 1967, now U.S. Pat. No. 3,551,678 and Richard L. Mitchell et al. application for U.S. letters Pat., Ser. No. 638,494, filed May 15, 1967, now U.S. Pat. No. 3,514,700, both assigned to the assignee of the present invention.

BACKGROUND OF THE INVENTION

In measuring the moisture content of webs of paper infrared radiation from the paper can provide an index of the moisture content of the paper. In general, this infrared must be sensed by an element close to the web, which is normally associated with various machinery and a relatively warm, moist atmosphere. Therefore, the apparatus used for the measurement should be relatively compact and some parts of it are likely to need protection from the thermal, mechanical and/or chemical influences obtaining in the environment of the web. In particular, the infrared radiation sensing element usually needs such protection. In the prior art, such protection has customarily been provided by vacuum sealing and/or liquid cooling of the elements.

SUMMARY OF THE INVENTION

In the present invention, the radiation sensing element, a lead sulfide photocell, say, is kept at a stable, desirable temperature by a thermoelectric cooler. The thermo-electric cooler and sensing element form a substantially-unitary solid state assembly contained within a sealed housing, in which the atmosphere is substantially the same as the earth's atmosphere at habitable altitudes.

Cooling the cell and also sealing it into a housing with this sort of atmosphere create the possibility of condensation of moisture within the housing. Since the cell could not distinguish between the effect of condensed moisture within the housing on the radiation it receives, from the effect on said radiation of the moisture in the web of paper, the moisture measurement would be highly inaccurate if such condensation occurred. Moreover, moisture condensation on the radiation sensing element itself could damage the element, and to the extent that it intercepted radiation it would decrease the efficiency of transmission of information from the web to the radiation sensing element. Accordingly, we provide means in the housing for removing moisture from the housings internal atmosphere. More particularly, desiccant such as silica gel is placed within the housing.

BRIEF DESCRIPTION OF THE DRAWING:

FIG. 1 is a schematic diagram of a moisture measuring system;

FIG. 4 is a perspective of the aforesaid structure on a reduced scale; and

FIG. 5 is a diagram of a thermo-electric cooler control circuit in accordance with the invention.

DESCRIPTION OF THE PREFERRED EMBODIMENT

Figure 3:
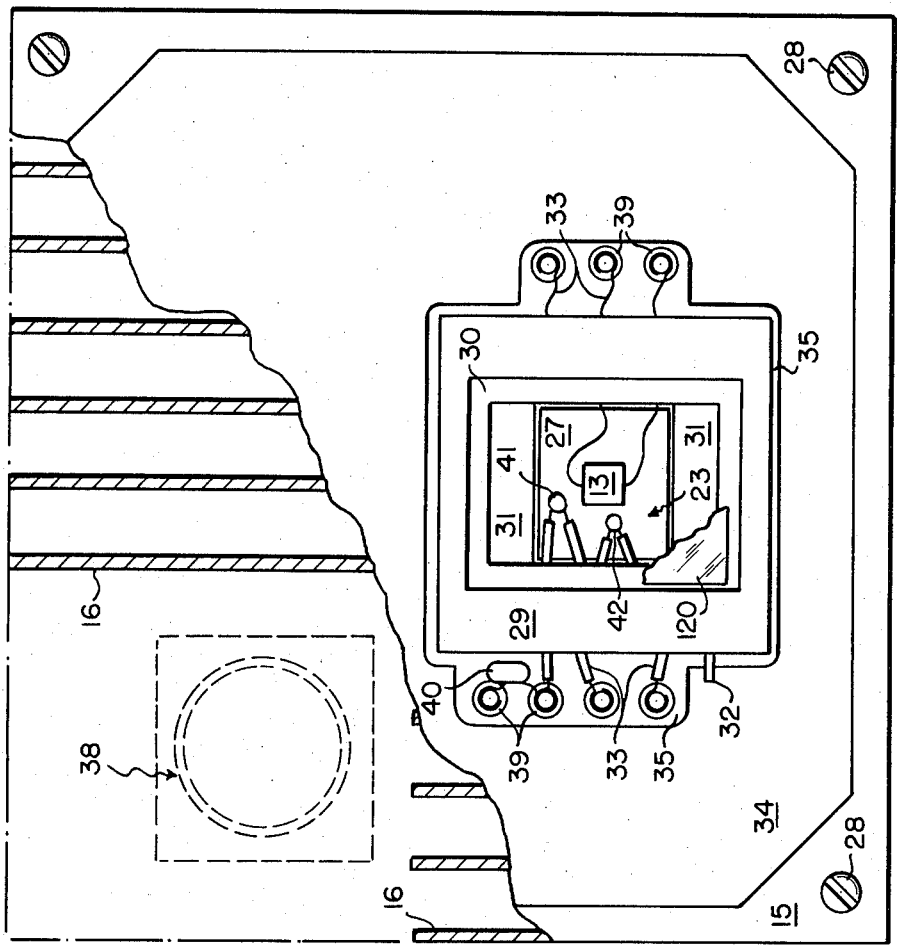
FIGS. 2 and 3 are respectively a plan and sectional life-scale view of structure for supporting a radiation sensing element in accordance with the invention.

FIG. 1 shows the basic elements of a moisture measuring system according to the invention. Thus, a housing 1 emits infrared (IR) radiation which is received by an area R of paper 10. The paper 10 variously reradiates and transmits IR from the paper, some of which IR passes through a window 12 of a housing 11 and irradiates an IR detector 13, such as a lead sulfide photocell, in series with a battery 17, and connected to circuitry 18 having the function of converting current through the cell into a corresponding signal suitable for measurement by instrument 14. The instrument 14 is shown as an indicator, say indicating percent moisture, by weight, of the web. However, the last said signal can equally well be used to control apparatus (not shown) handling or treating the web. In any event, no matter how it is used, said last said signal is a measure of moisture.

As the overall measuring system, as described thus far, can be realized in various ways, for example, as described in the above-referred to Mitchell and Mitchell et al. applications for patent, it is unnecessary to further consider the system as such, except to observe that proper operation of the system is crucially dependent on proper operation of the detector 13.

Housing 11 has the basic purpose of isolating detector 13 from all environmental influences save IR from the area R of paper 10. According to the invention, the housing 11 and its contents, for such purpose, are constituted as set forth in FIGS. 2, 3 and 4.

Figure 2:
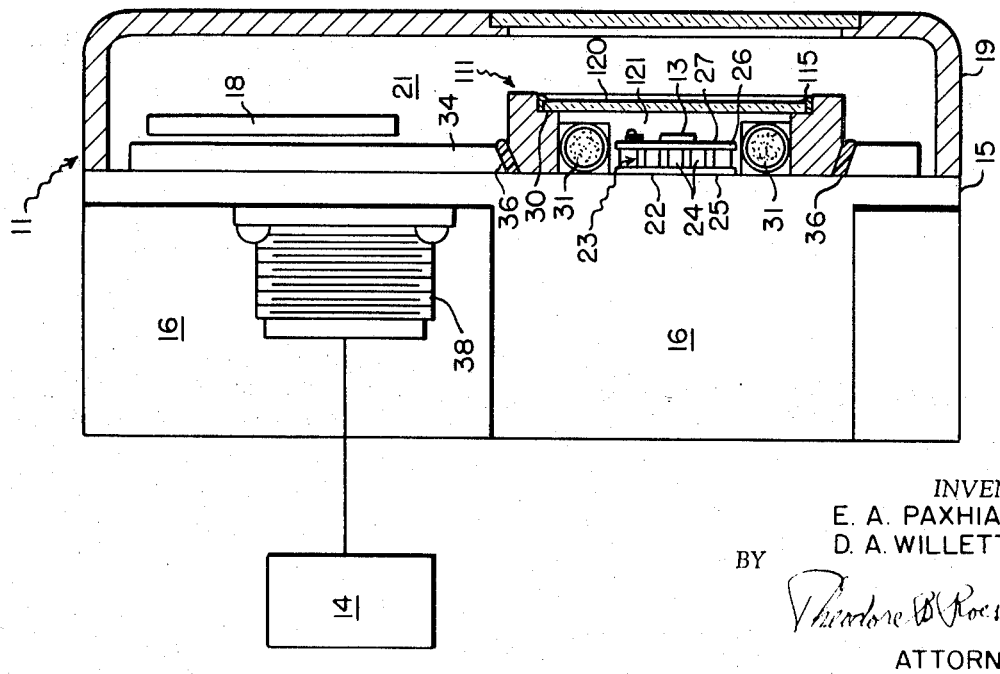

As shown in FIGS. 2 and 3, housing 11 includes a base 15 having fins 16 and a connector 38. Base 15 and fins 16 are preferably made of one single piece of suitable heat conductor such as aluminum.

Housing 11 also includes an outer cover 19 having therein an IR transparent window, such as a quartz plate 20. Plate, outer cover and base, when assembled as shown, provide an interior space 21 which is hermetically sealed from the atmosphere external to space 21. Any suitable gasketry or other conventional sealing means (not shown) may be provided where base, outer cover and plate join, in order to assume a hermetic seal.

The inner surface of base 15 has seated flush thereon the hot surface 22 of a thermo-electrical cooler 23 having the usual array of P and N members 24, only a few of which are shown. These P and N members are supported by plates 25 and 26, which plates are made of copper or the like good heat conductor. The ends of the members are fixed to the plates 25 and 26 so as to have good heat transfer relations, while being electrically insulated from the plates, as by a thin layer of electrical insulation (not shown). The members 24 are electrically arranged as series or series parallel PN junctions through which DC can be passed so as to cause heat to be absorbed at the member ends fixed to plate 26 and to be evolved at the member ends fixed to plate 25. This makes the surface 22 of plate 25 the hot surface, in effect, of hot PN junctions, and the surface 27 the cold surface, in effect, of cold PN junctions.

The proportions of base 15 and fins 16 are selected so that over a given range of ambient temperature effect on the base 15, the heat exchange between base 15 and fins 16, on the one hand, and the surrounding environment, on the other hand, will be sufficient to keep detector 13, which is fixed flush to surface 27 for good heat transfer thereto but electrically insulated therefrom (as by a layer of electrical insulation, not shown), at a given temperature. In effect, then, the integral member formed by base 15 and fins 16 is a heat sink maintaining the hot junctions of the cooler 23 at substantially the ambient temperature of the environment as determined by radiation, convection and conduction of heat between base and fins, on the one hand, and other heat sources and/or sinks forming said environment.

The detector 13 is essentially a lamina of lead sulfide of the dimensions shown, connected as a photo-sensitive resistor to the circuitry 18 by a pair of suitable leads.

The main functions of cover 19 are to protect the detector 13 from mechanical effects, and other grossly deleterious influences, while at the same time allowing the detector to "see" enough of surface R of web 10 that the active element of the detector, namely, its exposed lead sulfide surface, is at all times in use entirely irradiated by the radiation from surface R. However, as it is desirable to make the cover 19 readily removable (to get at circuitry 18, for instance), as by unloosening means such as screws 27, inner housing 111 is also provided, for substantially permanently stabilizing the immediate environment of the detector 13.

Inner housing 111 includes a more or less square frame 29 having a window and seating flush on the flat surface of base 15, and circumscribing cooler 23. In the opening defined by the frame is fixed a window preferably in the form of a plate 120 of "Carrara", a sort of darkly-blue translucent glass which transmits infrared mainly.

Preferably, the frame 29 is an epoxy-casting, vacuum-impregnated, with plate 120 sealingly cemented to a suitable ledge 30 around the inside of the frame opening, as shown at 115, and with the frame itself sealingly cemented to the surface of base 15.

The frame 29 is just large enough in inner area to contain the cooler and a pair of desiccant packs 31, conveniently, porous paper tubes stuffed with silica gel. The depth of the frame, however, is chosen to be such that the plate 120 is far enough removed from the cold surface 27, that the temperature of the outer surface of plate 120 (i.e., that surface next adjacent space 21) is determined mainly by thermal conditions within space 21.

Normally, the contents of space 21 will be that of the atmosphere surrounding the housing 11 (or an equivalent atmosphere). The temperature of this atmosphere will be substantially ambient temperature, i.e., that of the base 15 and cover 19, and the said outer surface of the plate 120 will be maintained substantially at said ambient temperature. In use, it is contemplated that moisture vapor will be trapped in space 21, but that ambient temperature will be well above the moisture's condensation temperature. Hence, no vapor will condense into moisture on the opposing faces of plates 20 and 120. It is to be observed that, customarily, the IR wavelengths used in moisture measurement are relatively insensitive to moisture vapor. Thus, the several wavelengths disclosed in the Mitchell application all have, in common, substantial insensitivity to moisture vapor, regardless of whatever else they are sensitive or insensitive to.

As for the inner surface of plate 120, i.e., that next adjacent the space 121 within inner housing 111, this space is filled with an atmosphere equivalent to that within space 21. Since the cold junction of cooler 23 is in space 121, there would be a possibility of vapor condensing on an adjacent surface of the structure bounding space 121, except that desiccant packs 31 withdraw whatever vapor there may have been in space 121 when the frame 28, plate 120 and base 15 were sealingly assembled together.

As compared to space 21, space 121 is substantially permanently sealed off hermetically, or at least, such is contemplated as long as it is not necessary to open cover 115 for some major reason, such as detector replacement. However, since the atmospheres in both spaces are each always at or nearly at the pressure of the atmosphere external to cover 15, a disruption or failure of sealing, short of opening both covers simultaneously, or the like, will be of little moment since before any of these atmospheres can leak appreciably into another thereof, there must be both a substantial pressure differential and a substantial leakage path, neither of which is ever likely to develop in the case of the seal between the parts of housing 111. Moreover, it will be noted that space 121 is quite small, so that substances, other than moisture, that might be present in the atmosphere of space 121, and chemically or otherwise deleterious to the detector's lead sulfide, which is exposed to the atmosphere in space 121, will be present in too slight concentration to affect the detector.

In constructing the housing 111, frame 29 is cemented in place, with plate 120 cemented in place on ledge 30. To test the seal between the cemented surfaces, the impregnation, and so forth, a vacuum is drawn on the space 121 via a tube 32 opening into space 121, and is tested in accordance with known practices. The vacuum is then released and the tube 32 is sealed shut after allowing sufficient time for the space 121 to fill up with the external atmosphere, to the value of external atmospheric pressure.

There are leads 33 shown coming out of housing 111. These are the leads of the detector 13, as well as other entities yet to be described. Preferably, the leads go through slots on the bottom of frame 29, which are sealed by potting compound, or the like. Thus, a board 34, of some suitable electrical and thermal insulating material such as Transite, or the like, is cemented or bolted flush to the surface of base 15, and has an aperture 35 therein within which the frame 28 seats with a circumferential spacing from the contour of the aperture. In this spacing, is potting compound 36 totally filling the said spacing continuously around frame 28.

On the board 34 is mounted circuitry 18, typically in the form of a circuit board. One set of leads 33 goes to the circuitry 18, and another set of leads 37 carry output of circuitry 18 to a waterproof connector 38. The remaining leads 33 go directly to the connector. Connector 38 provides for taking leads 33 and 37 out of housing 15 while maintaining a hermetic seal to the leads. As there are numerous commercially available forms of such connectors, no particular structure therefore is shown.

The leads 33 have terminals 39 interposed therein adjacent to frame 28 and with aperture 35 of 34. The terminals, essentially metal pins, are fixed to (but electrically insulated from) base 15 by any suitable means (not shown). Between two of terminals 39 is connected a thermistor 40. Thermistor 40 is embedded in the potting compound in aperture 35, and is thereby closely-coupled thermally to base 15.

Another thermistor 41 is cemented, with close-coupling thermally to cold surface 27, and likewise a thermocouple 42, or the like, has its sensing junction fixed to cold surface 27, closely-coupled thermally thereto.

Thermistors 40 and 41, and thermocouple 42, provide for control of the thermo-electric cooler 23. Briefly stated, thermistor 41 provides for control of current through the cooler, thermistor 40 provides for limiting such current, and thermocouple 42 is merely an occasional convenience for setting circuit constants in the circuit used for controlling the cooler.

The basic property of the cooler is that over a certain range of hot junction temperatures, as established by the heat sinking of the hot junction, it will create a given differential between cold junction temperature and hot junction temperature for a certain value of current through the cooler. In the present case, the cooler is used to keep the detector 13° at 60° Fahrenheit, for ambient temperature ranging from (60°–140)°F., or at 100°F., for ambient temperatures ranging from (100°–180)°F. These specifications arise because ambient temperature of normal use in moisture measuring in paper mills can range from (60°–180)°F., whereas available coolers suitable for our use have a maximum temperature differential rating of about 80F°. Further, increasing the current to try to produce a greater differential than this very soon overheats the cooler to the point of damaging its junctions. The control circuit for the cooler 23 is shown in FIG. 5, in which the parts are, for the most part, designated with their circuit values or specific identities. Since the control circuit is essentially a system of "black boxes", the functions and contents of which are well-understood, the circuit will be so-described with relatively little reference to specific detail.

Thus, reference numeral 43 identifies a differential DC amplifier of commercial provenance provided with the usual feedback elements, input and output circuitry, and power supplies for providing output voltage proportional to the difference in a pair of DC voltages on the amplifier's input, at a voltage gain of about 10.

A bridge 44 provides the said difference, and has as one arm the thermistor 41, say a negative temperature coefficient type. The other arms of the bridge are fixed in resistance, except that the one of these arms can have one or the other of two fixed resistors switched therein, corresponding to which of the two cold junction temperatures is to be maintained by the cooler 23. The bridge, as shown, is energized by positive and negative voltage supplies.

The output voltage of amplifier 43 is connected to a transistorized DC current regulator 45, the load of which is cooler 23 (represented by the DC resistance of its PN junctions). The source of DC current for the cooler is a rectified DC source 46 energized by mains AC. As shown, the source is a full wave rectifier having an LC output filter across which is a load-stabilizing bleeder resistor. As shown, regulator and DC source parameters are chosen in contemplation of there being a voltage across the bleeder resistor of about 5 volts, corresponding to a voltage of about 1 volt across the cooler 23, for the maximum cooler current of about $5a$ DC. These voltage figures are merely typical, and of course, parameters are chosen to suit the particular cooler's current demand for producing the desired cold junction temperature.

In between amplifier 43 and regulator 44 interposed a switch 47 consisting essentially of a transistor base-biased by positive voltage into conductivity. Thermistor 40, a negative coefficient type connects a negative voltage to the base of the last said transistor. Thermistor 40 is chosen so that at around 200°F ambient temperature, its resistance is low enough that the negative voltage can overcome the positive voltage and bias the transistor off, but also so that, at lower temperatures, the resistance of thermistor 40 is high enough that the positive voltage can keep the transistor conductive.

In practice, the amplifier is adjusted so that when the bridge 41 is balanced, the voltage input to the regulator 45 will be such that the regulator will apply a current to cooler 23 of such value as to maintain a given cold junction temperature in cooler. This temperature, of course, must be chosen in relation to hot junction temperature. If either of these two temperatures change, the bridge will unbalance correspondingly, and cause amplifier to increase or decrease its output voltage, and, consequently, regulator 45 to correspondingly change current through the cooler 23.

Harking back to the two ambient temperature ranges hereinabove defined, it is evident that the "LO" or the "HI" resistor in bridge 44 is switched in, depending on whether ambient (that is to say, hot junction temperature of cooler 23) is in the lower or higher of said ranges. The need for the two resistors stems from the fact that overall ambient range (the two ranges combined) represents a much larger temperature differential than the cooler used can provide. Hence, to keep the differential within bounds, it is necessary to provide for different sensing element temperatures, two in this case, none of which will create a demand for unreasonable temperature differentials in the overall range of ambient temperature.

The overall ambient range, of course, depends on what can be expected from the environment of the measuring system. Experience shows that one or the other of the two ambient ranges described normally obtains in the usual moisture measuring situation. However, the occurrence of abnormal ambient temperatures is prevented from damaging the cooler by the action of switch 47. Thus, the switch circuit parameters are typically chosen to cause the switch to cease conducting at about 200°F as measured by thermistor 40.

No values are given in FIG. 5 for the "LO" and "HI" resistors since these depend on the values of resistance of thermistor 41 at a given temperature, which values normally can be fixed most conveniently by trial. This is the purpose of thermocouple 42. Thus, current through cooler 23 is regulated to produce 60°F (or 100°F) by choosing the "LO" (or "HI") resistor so that is substantially balances the bridge 44 at this temperature, i.e., has the same resistance as thermistor 41. The with-feedback gain of amplifier 43 is chosen to be such that unbalance of the bridge suffices to make the amplifier cause the regulator to drive the desired current through cooler 23. Consequently, to find the right "LO" (or "HI"), the circuit is shown as set into operation, and then "LO" (or "HI") values of resistance are tried until the temperature measured by thermocouple 42 is 60°F (or 100°F). This condition means that the "LO" (or "HI") resistance is just enough different from the thermistor 41 resistance (plus 1K ohms) to make the bridge unbalance the few millivolts necessary to cause the amplifier 43 to produce a voltage at the regulator input (point A in FIG. 5) that makes the regulator 45 drive the 60°F (or 100°F) value of current through cooler 23.

Thermistors 40 and 41 have the usual thermistor property of changing resistance sharply for relatively small changes in temperature. This sensitivity complements the sensitivity of amplifier 43 to bridge unbalance.

As for switch 47, this sensitivity makes bias on the switching transistor change enough over a temperature range narrow enough (e.g., 180°F to 220°F) to give a limit switch effect. The thermistor has otherwise relatively little influence on transistor bias, outside said temperature range.

So-called regulator 45 is not a regulator in the usual sense, but is rather an emitter follower, the output resistance of which is in series with cooler resistance and proportional to the voltage at point A. Thus, should bridge unbalance cause point A to go negative, the follower transistors simply cut off the cooler current. Accordingly, in operation, the cooler is variously either being energized by DC of proper polarity to withdraw heat from the cold junctions, or it is not energized at all, in which case heat from base 15 is being transmitted via the cooler's PN members to the cold junctions.

Of course, it is within the scope of the invention to provide more sophisticated switch circuitry capable of both initiating and completing the limiting effect much more closely to 200°F, if desired or necessary. Likewise, the so-called regulator 45 has essentially the property of a voltage-controlled resistance, and other known circuits or devices having such property could be used instead of the configuration shown.

In FIG. 5, amplifier 43 was a Type 709c from the Fairchild Camera and Instrument Corporation. The cooler 23 was procured from Edgerton, Germeshausen and Greer, Inc., Part No. D–9–60. Thermistor 41 had a resistance of about 6 Kohms at 100°F, and thermistor 40 had a resistance of about 217K ohms at 100°F. In FIG. 5, the indicative resistances are given in ohms.

The specific values and identities given in the foregoing description of our invention are merely by way of example, and are not to be taken as limiting the scope of our invention. In particular, it is not essential that element 13 be a lead sulfide cell, and our invention is in fact applicable to a wide range of presently-known photo-voltaic, photo-conductive, and other varieties of radiation sensing elements.

Again, as FIG. 1 suggests, the greater part of the circuitry of the system, including the cooler control circuit, is located more or less remote from the housing 11. It is within the scope of the invention to locate more or less of the system circuitry within housing 11.

The term "moisture" herein means liquid as opposed to gas or vapor of such liquid.

WE CLAIM:

1. A system for measuring a property of a material, said system including, in combination,
   emitting means for emitting radiant energy influenceable by said property;
   sensing means for producing a signal representative of the intensity of radiant energy influenceable by said property and incident on said sensing means;
   measuring means connected to said sensing means for receiving said signal and for providing a measure of said property from said signal;
   and there being structure supporting said emitting and sensing means for directing radiant energy emitted by said emitting means on to said material and for directing the last said radiant energy, after being influenced by said property in said material, on to said sensing means;
   and said system having the improvement comprising a thermo-electric cooler having a hot junction and a hot junction surface, and a cold junction and a cold junction surface;
   said radiant energy sensing means being mounted on said cold junction surface for having its temperature maintained at substantially the temperature of said cold junction;
   and there being control means for electrically energizing said cooler for maintaining said cold junction at a predetermined temperature.

2. The system of claim 1, wherein said structure includes a heat sink for assuming a temperature substantially determined by said structure and by the environment containing said structure;
   said cooler having its hot surface mounted to said heat sink for substantially maintaining its said hot junction at the said temperature of said heat sink.

3. The system of claim 1, wherein said control means includes an electrical power source connected to said cooler for electrically energizing same;
   said control means also including temperature measuring means responsive to the temperature of said cold junction and connected to said source for causing same to electrically energize said cooler to the degree necessary to maintain said cold junction substantially at said predetermined temperature;
   said control means including limiting means effectively responsive to the temperature of said hot junction for limiting electrical energization of said cooler to a degree insufficient to make the temperature of said hot junction rise to an undesirable value.

4. The system of claim 3, wherein said structure includes a heat sink for assuming a temperature substantially determined by said structure and the environment containing said structure;
   said cooler having its hot surface mounted to said heat sink for substantially maintaining its said hot junction at the said temperature of said heat sink.

5. The system of claim 3, wherein said temperature measuring means is constructed and arranged to produce an electrical signal representative of the temperature of said cold junction, and said source is constructed and arranged to respond to said electrical signal by electrically energizing said cooler in accordance with said electrical signal;

said limiting means being a switch interconnecting said temperature measuring means and said source for conduction of said electrical signal to said source;

said switch being solid state means having first bias means normally connected thereto for biasing said solid state means into said conduction;

said limiting means also including second bias means, and there being thermistor means responsive to temperature of said hot junction rising to said undesirable value to apply the bias of said second bias means to said solid state means for biasing this last into non-conduction.

6. The system of claim 5, wherein said second bias means is a source of voltage, and said thermistor means is a thermistor connecting said source of voltage to said solid state means.

7. The system of claim 1, wherein said structure includes a housing enclosing said sensing means in the interior of said housing, and said housing having a window interposed between said sensing means and the said last said radiant energy, and being substantially transparent thereto;

and there being desiccant means in said interior for absorbing moisture from said interior.

8. The system of claim 1, wherein said structure includes a first housing enclosing said sensing means and said cooler in the interior of said first housing, and said first housing having a first window interposed between said sensing means and the said last said radiant energy, and being substantially transparent thereto;

said structure including a second housing enclosing the said first housing in the interior of the said second housing, and having a second window interposed between the said first window and said last said radiant energy, and being substantially transparent thereto.

9. The system of claim 8, wherein said structure includes a heat sink for assuming a temperature substantially determined by the said structure and by the environment containing said structure;

said cooler having its said hot surface mounted to said heat sink for substantially maintaining its said hot junction at the said temperature of said heat sink;

said structure also including both said housings, and said heat sink forming a common portion of both said housings.

10. The system of claim 9, wherein each said housing contains its own atmosphere, and said cold surface is spaced from said first window enough that the surface of said window exposed to the said atmosphere of said second housing is at substantially the temperature of the last said atmosphere.

11. A structure for a measuring system responsive to radiant energy, comprising a thermo-electric cooler having a hot junction and a hot junction surface, and a cold junction and a cold junction surface;

said cold junction surface having thereon, in intimate thermal contact therewith, a sensing means responsive to radiant energy to produce a signal in accordance with the amount of said radiation energy incident on said sensing element;

and the improvement wherein said structure includes a housing enclosing said sensing means and said cooler in the interior of said housing, said housing having a window interposed between said sensing means and the last said radiation energy, and being substantially transparent thereto; and ther being desiccant means in said interior for absorbing moisture from said interior.

12. The structure of claim 11, wherein said structure includes a second housing enclosing the first said housing in the interior of said second housing, said second housing having a window interposed between the first said window and said last said radiant energy, and being substantially transparent thereto.

13. The structure of claim 12, wherein each said housing contains its own atmosphere, and said cold surface is spaced from said window of said first said housing enough that the surface of the last said window exposed to the said atmosphere of said second housing is substantially at the temperature of the last said atmosphere.

14. A structure for a measuring system responsive to radiant energy, comprising a thermo-electric cooler having a hot junction and a hot junction surface, and a cold junction and a cold junction surface;

said cold junction surface having thereon, in intimate thermal contact therewith, a sensing means responsive to radiant energy to produce a signal in accordance with the amount of said radiation energy incident on said sensing element;

and the improvement wherein said structure includes a housing enclosing said sensing means and said cooler in the interior of said housing, said housing having a window interposed between said sensing means and the last said radiation energy, and being substantially transparent thereto, said structure also including a second housing enclosing the first said housing in the interior of said second housing, said second housing having a window interposed between the first said window and said last said radiant energy; and being substantially transparent thereto; and said structure also including a heat sink for assuming a temperature substantially determined by the said structure and by the environment containing said structure;

said cooler having its hot surface mounted to said heat sink for substantially maintaining its said hot junction at the said temperature of said heat sink;

said heat sink forming a common portion of both said housings.

15. The structure of claim 14, wherein said second housing contains its own atmosphere, and said cold surface is spaced from said window of said first said housing enough that the surface of the last said window exposed to said atmosphere is substantially at the temperature of said atmosphere.

* * * * *